Dec. 23, 1924.

T. A. JENKS ET AL 1,520,498

BROILER

Filed Oct. 24, 1923

INVENTORS
Thomas A. Jenks
-and-
BY Robert O. Hammond.
Osborne H. Gurney
ATTORNEY

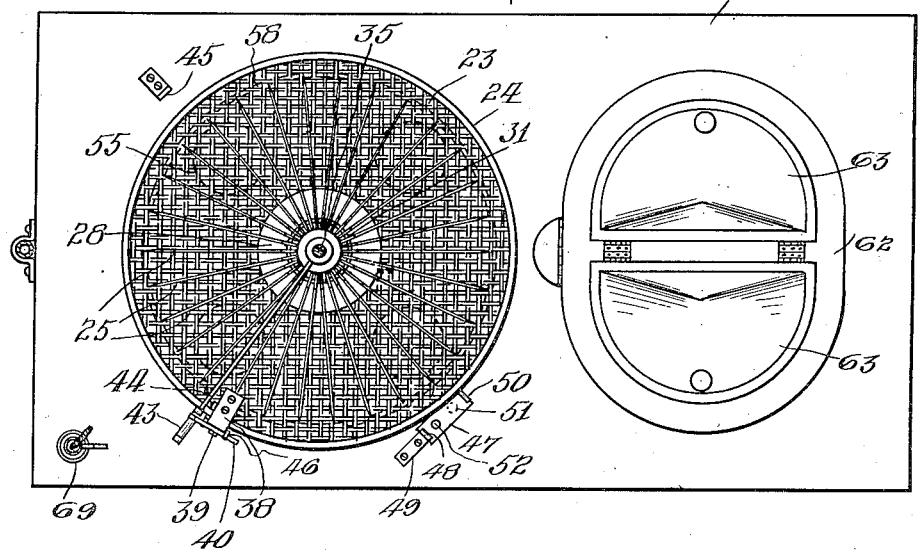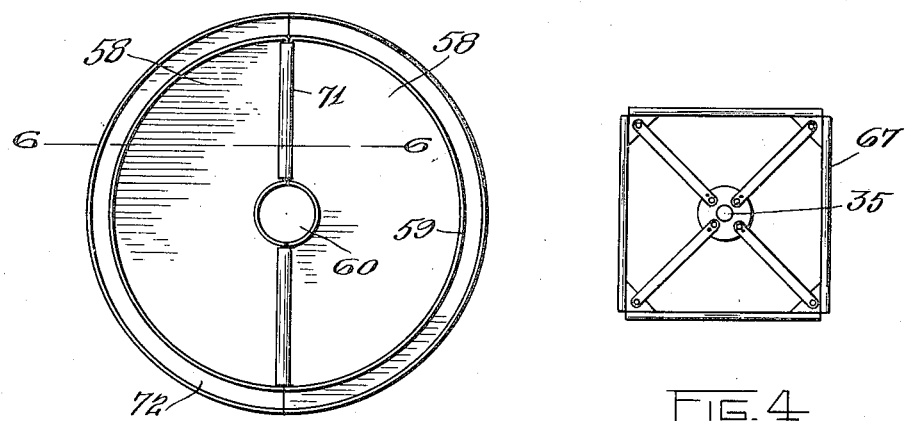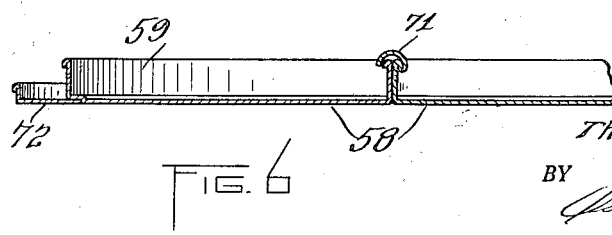

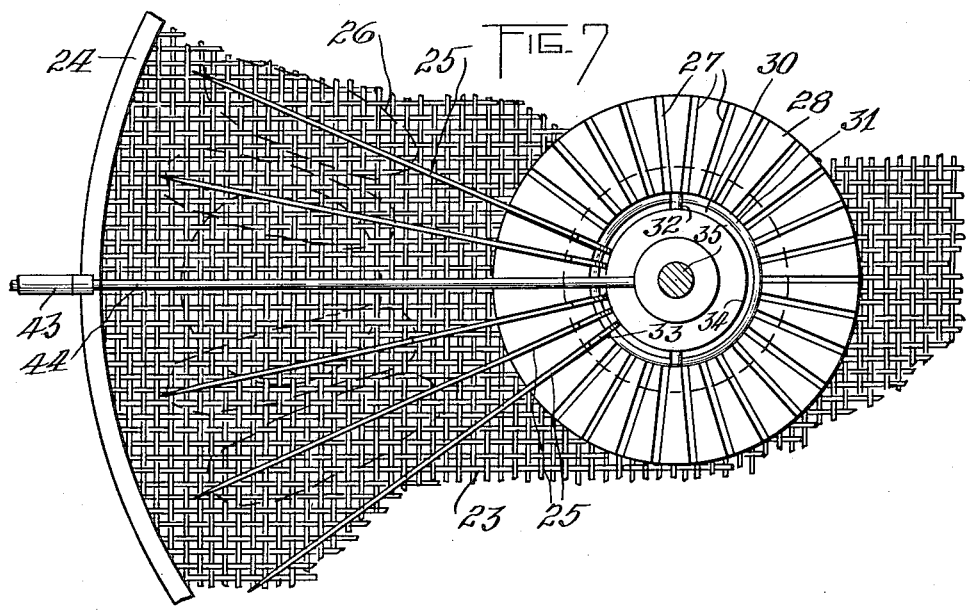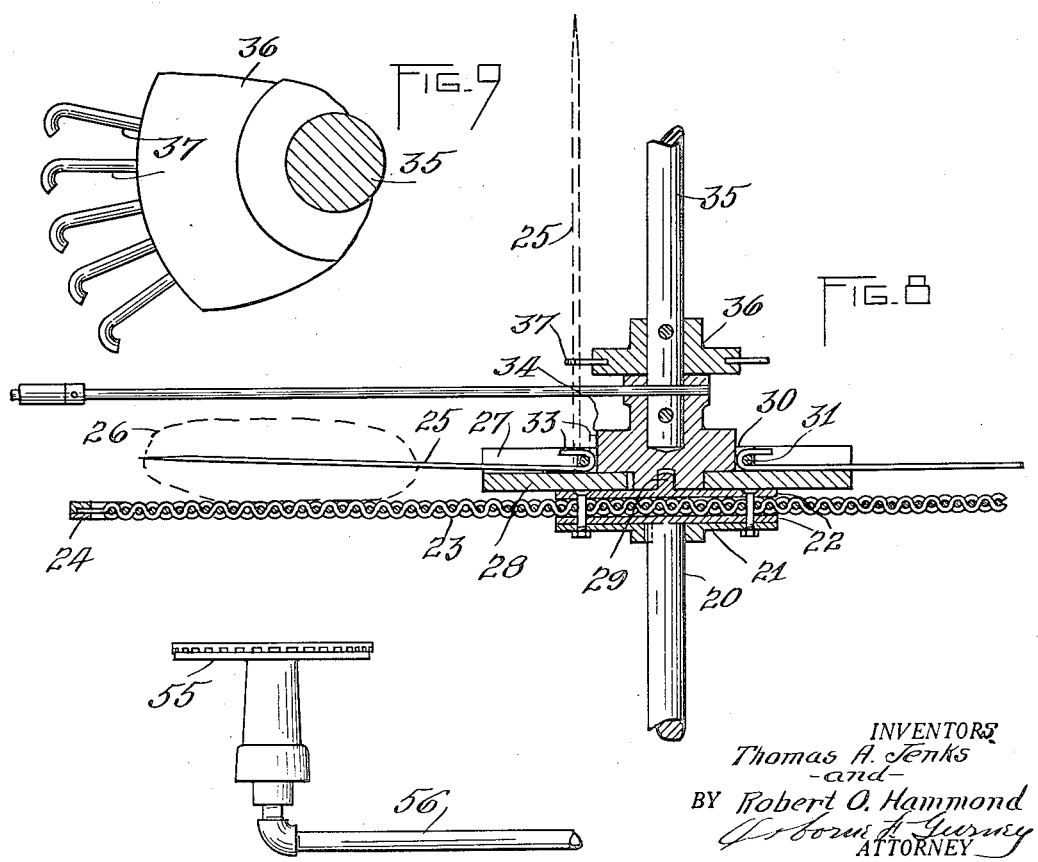

Dec. 23, 1924.                                                          1,520,498
T. A. JENKS ET AL
BROILER
Filed Oct. 24, 1923           4 Sheets-Sheet 4
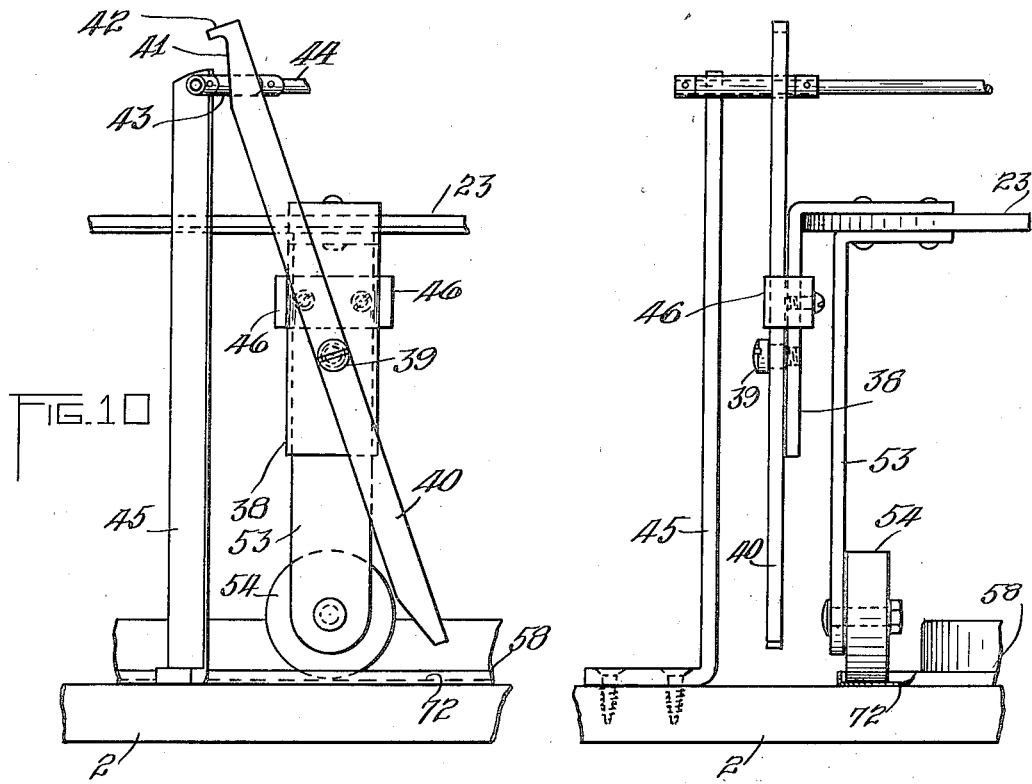
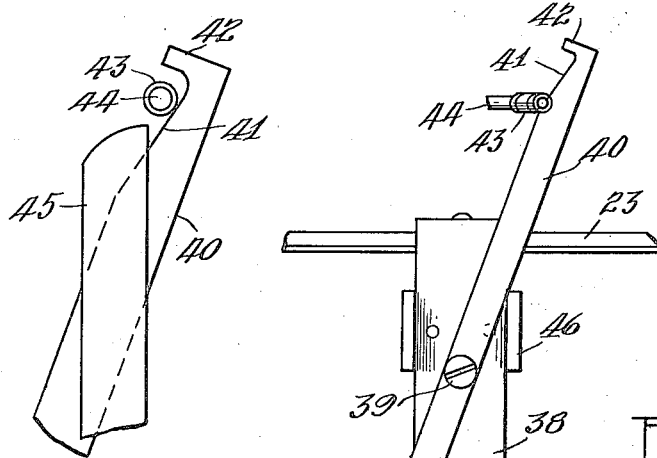
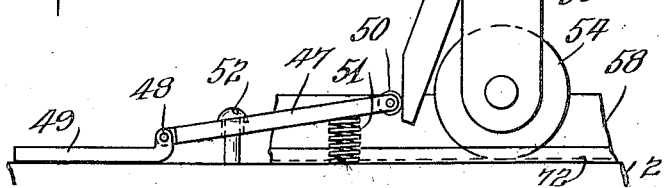
INVENTORS.
Thomas A. Jenks
and
BY Robert O. Hammond.
ATTORNEY Patented Dec. 23, 1924.

1,520,498

UNITED STATES PATENT OFFICE.

THOMAS A. JENKS AND ROBERT O. HAMMOND, OF ROCHESTER, NEW YORK, ASSIGNORS, BY MESNE ASSIGNMENTS, TO THE GENESEE BROILING MACHINE COMPANY, INC., OF ROCHESTER, NEW YORK.

BROILER.

Application filed October 24, 1923. Serial No. 670,591.

*To all whom it may concern:*

Be it known that we, THOMAS A. JENKS and ROBERT O. HAMMOND, citizens of the United States, residing at Rochester, in the county of Monroe and State of New York, have invented a new and Improved Broiler, of which the following is a specification.

The present invention while relating to broiling apparatus in general has more especial reference to a device particularly adapted to broiling sausages, an object of the invention being to provide means whereby the sausages will be automatically turned over intermittently and in such manner as to be evenly browned and thoroughly cooked.

Another object of the invention is to provide a broiler having a grid mounted to turn about a vertical axis, and means for removably holding sausages in spaced relation radially on the grid, the grid and spacing means co-operating at intervals during each complete rotation of the grid to simultaneously cause a certain degree of rolling movement of the sausages.

Another object of the invention is the provision of a simple actuating mechanism for positively effecting the said rolling or turning over of the sausages.

A further object of the invention is the provision of spacing or holding members of such a character that one or any number of the sausages, up to the maximum capacity, may be broiled, and also means whereby the holding members not in use may be held in an inoperative position away from the grid, and, furthermore, to employ the several holding members, or certain ones, as a rack for supporting bread or other articles if it is desired to make use of the apparatus as a toaster, that is,—the construction of the apparatus is such that it may be used as a broiler or toaster or both at the same time.

Another object of the invention is to provide an apparatus of the character described that is of open construction so as to be readily cleaned, and to make further provision for both cleanliness and convenience by mounting the broiler upon a support having covered compartments, heated if desired, for containing rolls or bread to be served with the sausages.

A further object of the invention is to provide a novel and attractive advertising device in combination with means for illuminating the broiler.

And, a still further object of the invention is the construction of a rotary broiler, for the purposes specified, having a large capacity but occupying a small space, and one that will be inexpensive to manufacture, install and operate.

To these and other ends the invention consists of certain parts and combinations of parts as will be fully set forth in the following description and particularly defined in the appended claims.

The accompanying drawings illustrating an apparatus constructed in accordance with the invention are as follows:—

Fig. 3 is a top plan view of the apparatus with the illuminating means and advertising device removed in order to more clearly show details of construction.

Fig. 4 is a top plan view of the frame for supporting the advertising cards.

Fig. 5 is a plan view of the drip pan.

Fig. 6 is a sectional view on the line 6—6, Fig. 5.

Fig. 7 is an enlarged fragmentary plan view of the grid, the impaling means and the rotary support for the impaling means.

Fig. 8 is a sectional view in the plane of the rod 44 Fig. 7.

Fig. 9 is a fragmentary plan view of the means for holding the impaling members in inoperative position.

Fig. 10 is a detail view in elevation showing the position of the actuating lever when engaging the means for stopping rotation of the impaling members.

Fig. 11 is a detail in side view of the parts seen in Fig. 10.

Fig. 12 is a detail view in elevation showing the position of the actuating lever when engaging the means for increasing the rotary movement of the impaling members.

Figure 1:
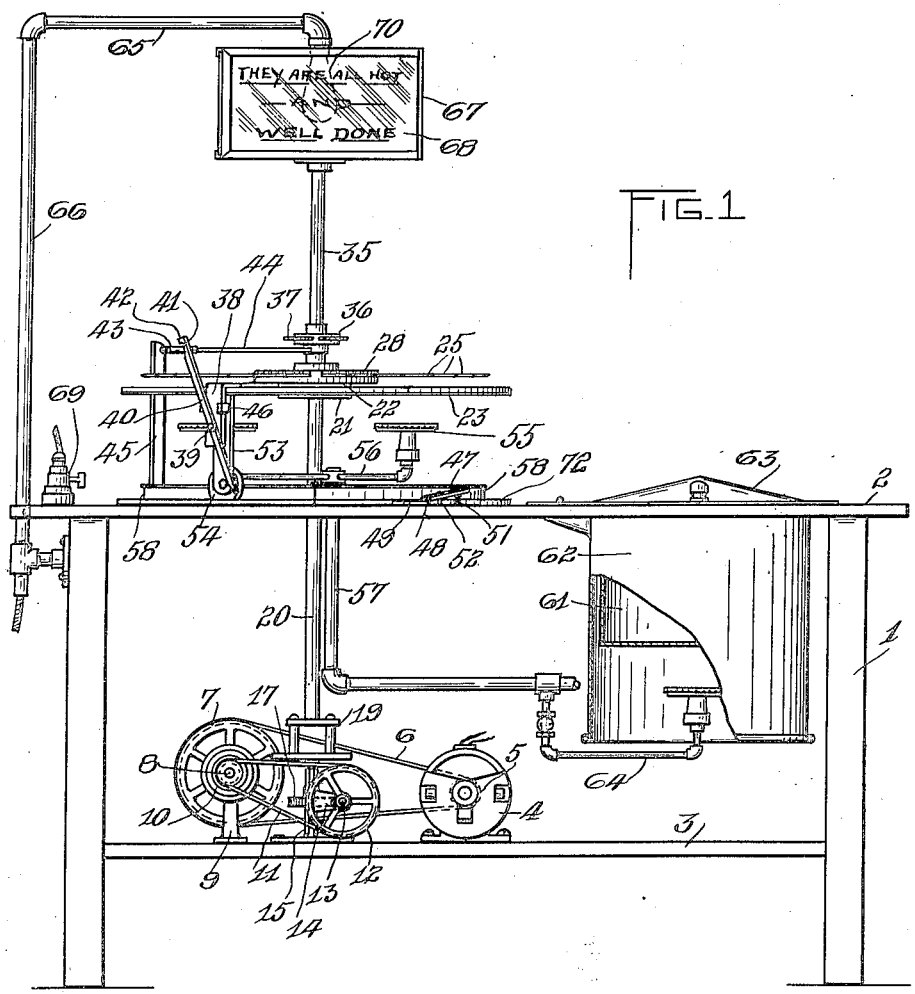
Figure 1 shows the apparatus in side elevation but with the supporting member for the impaling means in central vertical section.
Figure 2:
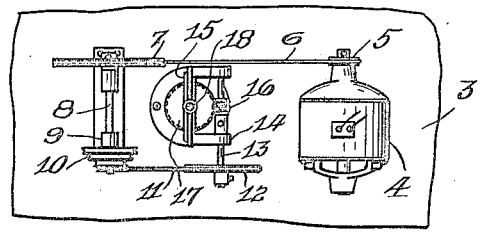
Fig. 2 is a detail plan view of the motor mechanism.

And, Fig. 13 is a detail showing engagement of the lever actuating arm with the cam surface of the lever.

In the drawings similar reference numerals refer to similar parts throughout the several views.

The broiler is supported upon a counter or table 1 having a top 2 and an under shelf 3. Secured to the shelf 3 is the motor apparatus which, in this instance, consists of an electric motor 4 on the shaft of which is a pulley 5 having connection by means of a belt 6 with a pulley 7 fixed to a shaft 8 rotatable in a bearing member 9, such shaft also carrying a cone pulley 10 which by a belt 11 drives a pulley 12 axially adjustable on a shaft 13 journaled in bearings 14 forming part of a casting 15 also secured to the shelf 3. Fixed to the shaft 13 is a worm 16 meshing with a worm wheel 17 on a shaft 18 arranged vertically in the support 15 and having rigid connection at 19 with the main shaft 20 which extends upwardly through an opening in the table top 2. It will thus be seen that the shaft 20 is driven from the motor 4 at a greatly reduced speed and that this speed may be changed by shifting the belt 11 on the cone pulley 10 and adjusting the position of the pulley 12 accordingly.

Secured to the upper end of the shaft 20 is a plate 21 to which is bolted the center clamping plates 22 of a grid 23, this grid, in the present instance, being circular and formed of coarse wire mesh with a ring 24 as a reinforcing peripheral binder.

Spaced above the grid 23 are a plurality of regularly spaced radially extending wires or rods 25 comprising spits or holding members on which the sausages, indicated at 26 are impaled. These wires are supported near their inner ends upon the bottom walls of upwardly opening radial slots 27 cut in a circular member 28 mounted to turn coaxially with the shaft 20, and centered with respect to such shaft by a stud 29 carried by the top grid plate 22 but being free to turn relatively to the grid. The slots 27 terminate at their inner ends in an annular recess 30 for receiving a ring 31 which is held against upward displacement by pins 32 fixed in the member 28, and to this ring are hingedly connected the inner ends of the wires 25, the inner end of each such wire being bent U-shape over the ring and formed with a short arm 33 which, when the spit is raised, abuts the upwardly extended inner wall 34 of the recess 30 and prevents the spit from passing beyond substantially a vertical position. Extending upwardly from the member 28 in line with the shaft 20 is a post or standard 35 on which is fixed a collar 36 provided with a plurality of radially extending pins 37 the outer ends of which form hooks to releasably engage the spits and hold them in a vertical position, there being one of these pins 37 for each spit or impaling wire 25. It will thus be seen that when any of the impaling wires are not in use they may be raised to a vertical position and held there by the pins 37, the yielding engagement of the wire ends 33 against the abutment 34 holding the wires in locking engagement with the hook ends of the pins 37.

The member 28 carrying the impaling wires 25, due to frictional engagement with the grid plate 22 and contact of the sausages with the uneven grid surface, normally rotates with the grid and at the same speed. It is necessary, however, in order to intermittently turn the sausages over, to change the relative speed of travel of the grid 23 and the member 28 at certain times during their rotation, and to this end we provide simple actuating devices now to be described.

Secured to the grid adjacent its peripheral edge is an arm 38 to which is fulcrumed at 39 a two arm lever 40, the upper arm projecting above the gird and having its forward side, with respect to the direction of travel of the grid, undercut to form a cam surface 41 and a hook portion 42, the latter engaging over a roller 43 on the outer end of a rod 44 extending radially from the spit supporting member 28. In the path of this rod 44 is a rigid upstanding arm 45 secured to the table top 2, such arm acting as a stop for the rod 44 which in turn stops rotation of the spit carrying member 28 whereby the sausages due to contact with rotating grid are caused to roll. When travel of the rod 44 is arrested it causes the lever 40 to swing from a forward to a rearward position between limiting stops 46 formed on the arm 38, and when the rearward position of the lever is reached the roller 43 being engaged by the cam surface 41 rides upwardly on such cam face causing the rod 44 to flex and pass over the top of the arm 45, whereupon the member 28 again starts rotating with the grid.

In the path of the lever 40 and adapted to be engaged by the lower arm thereof is an upwardly inclined spring plate 47 hingedly connected at 48 to a plate 49 secured to the table top 2, this plate 47 preferably being located diametrically opposite the stop arm 45, with respect to the grid, and having a lever engaging roller 50 in its free end, while upward movement of the plate due to action of a compression spring 51 is limited by a stop screw 52. When the lower arm of the lever engages the roller on the spring plate 47, the lever is swung to its forward position and, due to the rod 44 being engaged by the hooked upper end of the lever 40, results in the spit carrying member 28 traveling faster for a short distance than the grid and again causing the sausages to roll simultaneously. The throw of the lever is such as, in each instance, to effect only a partial rotation of the sausages about their axes. The stop plate 47, it will be noticed, resets the lever 40 for actuation by the fixed stop 45 and rod 44, and it will also be noticed that when the relative rotary speed of the grid and member 28 is changed the member 28 stops rotation in one instance and in the other instance is caused to travel faster than the grid.

Also secured to the grid at a point near the lever arm 38 is a second arm 53 which carries a roller 54 adapted to travel on the table top 2. This roller support prevents any sagging of the grid which might throw the lever 40 out of proper registry with the rod 44 and the spring plate 47.

We prefer to use illuminating gas as the means for heating the broiler and to this end a plurality of burners 55 are supported intermediate the table top 2 and the grid 23 on pipes 56 extending laterally from a main pipe 57 extending upwardly through the table top adjacent the shaft 20. These burner are formed, preferably, with lateral openings so as not to become clogged by grease dropping from the grid.

In order to catch what grease may drip from the grid, a drip pan is provided, this pan being formed in two semi-circular sections 58 having flanges 59 formed on their peripheral and adjoining edges, the two sections when united having a circular opening 60 for encircling the shaft 20 and the gas supply pipe 57, while the adjoining flanges 59 are covered by overhanging apron members 71 carried by one of the pan sections. The bottoms of the pan sections are extended to form an annular track 72 for the grid supporting roller 54 and this track portion is reinforced by having its edge turned upwardly which also permits the track portion to retain any drippings that may fall thereon.

Opening upwardly through the table top 2 are compartments 61 of a water jacketed steamer 62 of known construction, the compartments having hinged covers 63 and the steamer being heated by a burner 55 having pipe connection 64 to the gas supply pipe 57. The steamer is conveniently located to the grid and not only adds to convenience in the handling of rolls served with the "hots" but keeps them warm and fresh.

For illuminating the grid, in this instance, an electric bulb is supported above the grid on the inturned arm 65 of a conduit pipe 66 extending upwardly from the table, and the light is also employed to illuminate an advertising device comprising a frame 67 surrounding the bulb and removably carrying on its side faces a plurality of sign cards 68, the sign being rotatable with the grid by being supported on the post or standard 35. At 69 is a switch arranged in the circuit, not shown, for controlling current to the motor 4 and the illuminating lamp 70.

From the foregoing it is believed that the construction and operation of the broiler is sufficiently clear to call for no further explanation. It might be added, however, that the device may also be used as a toaster for bread or the like by placing the bread on a number of the spits 25 which, in such instance, would comprise a supporting rack, and that certain of the spits might be used for this purpose while sausages were impaled on others, in which event the device would function both as a toaster and broiler. Also, the spits are raised to impale sausages thereon and the sausages are removed when broiled by being grasped by tongs in the hand of an attendant.

What we claim is:

1. In a sausage broiler, a grid, spits arranged substantially parallel with the grid for holding the sausages in spaced relation and in yielding contact with the grid, a support to which said spits are hingedly connected, and means for effecting a relative movement of the grid and said spits to turn the sausages over.

2. In a sausage broiler, a grid, spits arranged substantially parallel with the grid for holding the sausages in spaced relation and in yielding contact with the grid, a support to which said spits are hingedly connected, means for releasably holding the spits in an inoperative position, and means for effecting a relative movement of the grid and said spits to turn the sausages over.

3. In a sausage broiler, two members mounted to rotate about a common axis and normally at the same speed, one of said members comprising a grid and the other a means for holding the sausages in spaced relation, and actuating means for intermittently changing the relative rotary speed of the two members, the said members co-operating to turn the sausages over.

4. In a sausage broiler, two members mounted to rotate about a common axis and normally at the same speed, one of said members comprising a grid and the other a means for holding the sausages in spaced relation, and actuating means for intermittently changing the relative rotary speed of the two members, the said members co-operating to turn all of the sausages over simultaneously.

5. In a sausage broiler, two members mounted to rotate about a common axis and normally at the same speed, one of said members comprising a grid and the other being provided with a plurality of radial arms for holding the sausages radially on the gird, and actuating means for intermittently changing the relative rotary speed of the two members, the said members co-operating to turn the sausages over.

6. In a broiler, a grid, a spit for supporting the article to be broiled in contact with the grid, the two members being mounted for rotary movement about a common axis and normally at the same speed, and actuating means for intermittently changing the relative speed of the two members to turn the said article over.

7. In a broiler, a grid, a flexibly mounted spit for supporting the article to be broiled yieldingly in contact with the grid, the two members being mounted for rotary movement about a common axis and normally at the same speed, and actuating means for intermittently changing the relative speed of the two members to turn the said article over.

8. In a broiler, a grid, a spit for supporting the article to be broiled in contact with the grid, the two members being mounted for rotary movement about a common axis, means for driving one of the members, the other member being rotated by frictional engagement with the said driven member and normally at the same speed, and actuating means for intermittently changing the relative speed of the two members to turn the said article over.

9. In a broiler, a grid, a spit for holding the article to be broiled in contact with the grid, a support for the spit frictionally engaging the grid, the grid and said support being mounted for rotary movement about a common axis and normally at the same speed, means for driving the grid, and actuating means for intermittently changing the relative speed of the grid and said member to turn the said article over.

10. In a sausage broiler, a grid and a supporting member mounted for rotary movement about a common vertical axis, a plurality of radially arranged spits carried by said member for holding the sausages in contact with the grid, there being frictional engagement between the grid and said spit carrying member whereby the two members normally travel at the same speed, and actuating means for intermittently changing the relative speed of the two members to turn the sausages over.

11. In a sausage broiler, a grid and a supporting member mounted for rotary movement about a common vertical axis, a plurality of radially arranged spits hingedly connected to said member for holding the sausages yieldingly in contact with the grid, means for driving the grid, there being frictional engagement between the grid and said spit carrying member whereby the two members normally travel at the same speed, and actuating means for intermittently changing the relative speed of the two members to turn the sausages over.

12. In a sausage broiler, a grid and a supporting member mounted for rotary movement about a common vertical axis, a plurality of radially arranged spits hingedly connected to said member for holding the sausages yieldingly in contact with the grid, means for driving the grid, there being frictional engagement between the grid and said spit carrying member whereby the two members normally travel at the same speed, actuating means for intermittently changing the relative speed of the two members to turn the sausages over, and retaining devices for releasably holding said spits in an inoperative position.

13. In a sausage broiler, a grid and a supporting member mounted for rotary movement about a common axis, a plurality of spits arranged in spaced relation on said member for holding the sausages in contact with the grid, means for driving the grid, there being frictional engagement between the grid and said spit carrying member whereby the two members normally travel at the same speed, actuating means for retarding the travel of said spits with respect to the grid to turn the sausages over, and additional actuating means for increasing the travel of said spits with respect to the grid to turn the sausages over.

14. In a broiler, a shaft, means for rotating the shaft, a grid secured to the shaft, a supporting member mounted to turn co-axially with said shaft, such member normally turning with the grid but being free for relative rotary movement, and impaling means comprising a spit carried by said member.

15. In a broiler, a shaft, means for rotating the shaft, a grid secured to the shaft, a supporting member mounted to turn co-axially with said shaft, such member normally turning with the grid but being free for relative rotary movement, and impaling means comprising a spit hingedly connected to said member.

16. In a broiler, a shaft, means for rotating the shaft, a grid secured to the shaft, a supporting member mounted to turn co-axially with said shaft, such member normally turning with the grid but being free for relative rotary movement, and impaling means comprising a plurality of spits carried by said member and extending radially therefrom.

17. In a broiler, a shaft, means for rotating the shaft, a grid secured to the shaft, a supporting member mounted to turn co-axially with the shaft, such member normally turning with the grid but being free for relative rotary movement, and impaling means comprising a plurality of spits hingedly connected to said member and extending radially thereof.

18. In a broiler, a shaft, means for rotating the shaft, a grid secured to the shaft, a supporting member mounted to turn co-axially with the shaft, such member normally turning with the grid but being free for relative rotary movement, impaling means comprising a plurality of spits hingedly connected to said member and extending radially thereof, and means carried by said supporting member for releasably holding any or all of said spits in an inoperative position.

19. In a broiler, the combination of a grid mounted to turn about a vertical axis and having an uneven surface, means for turning the grid, a spit, a support for the spit mounted to rotate co-axially with the grid, there being frictional engagement between the grid and said support whereby the two members normally travel at the same speed, said spit holding the article to be broiled in contact with the grid but being free to move in a vertical plane, and means for intermittently changing the relative speed of the grid and said spit support to effect a turning of said article on the spit by reason of its contact with said uneven grid surface.

20. In a broiler, the combination of a shaft, a grid secured to the shaft, a plate mounted for rotation co-axially with the shaft, said plate being formed with an annular recess and a plurality of upwardly opening radial slots extending outwardly from said recess, a locking ring within the recess, impaling means comprising spits formed of wires having their inner ends hooked over said ring, and means for holding the ring against removal.

21. In a broiler, the combination of a shaft, a grid secured to the shaft, a plate mounted for rotation co-axially with the shaft, said plate being formed with an annular recess and a plurality of upwardly opening radial slots extending outwardly from said recess, a locking ring within the recess, impaling means comprising spits formed of wires having their inner ends hooked over the said ring, means for holding the said ring against removal, and fastening devices carried by the said plate for releasably holding any or all of said spits in inoperative position.

22. The combination, in an apparatus of the character described, of a plate mounted for rotary movement about a vertical axis and a support for the plate, said plate being formed with an annular recess having inner and outer walls and a plurality of upwardly opening radial slots extending from the outer wall of said recess, said slots being of a depth less than the thickness of the plate, a retaining ring wthin said recess, and a plurality of spits comprising wires lying in said slots and having their inner ends hooked over said ring and extended forwardly, the inner wall of said recess forming an abutment for said forwardly turned looped ends of the spits when the latter are raised to a vertical position.

23. The combination, in an apparatus of the character described, of a plate mounted for rotary movement about a vertical axis and a support for the plate, said plate being formed with an annular recess having inner and outer walls and a plurality of upwardly opening radial slots extending from the outer wall of said recess, said slots being of a depth less than the thickness of the plate, a retaining ring secured within said recess, a plurality of spits comprising wires lying in said slots and having their inner ends hooked over said ring and extended forwardly, the inner wall of said recess forming an abutment for the forwardly turned looped ends of the spits when the latter are raised to a vertical position, a collar carried by and above said plate, and a plurality of pins extending radially from said collar, said pins being formed with hook ends for releasably engaging said spits when the latter are raised to inoperative position.

24. In a broiler, the combination of a grid mounted for rotary movement about a vertical axis, means for rotating the grid, a member mounted to rotate co-axially with the grid, an arm extending from said member, a stop in the path of the arm for arresting rotation of said member, the engagement of the arm with said stop being flexible to permit the arm to pass the stop, and means carried by the grid for effecting said passage.

25. In a broiler, the combination of a grid mounted for rotary movement about a vertical axis, means for rotating the grid, a member mounted for movement co-axially with the grid, a flexible arm extending from said member, a stop in the path of the arm for arresting rotation of said member, and means carried by the grid for flexing said arm to cause it to pass said stop.

26. In a broiler, the combination of a grid mounted for rotary movement about a vertical axis, means for rotating the grid, a member mounted for movement co-axially with the grid, an arm extending radially from said member, a lever fulcrumed intermediate its ends to the grid and having its upper end adapted to engage said arm to form a driving connection between the grid and said member, a stop in the path of said lever adapted to yieldingly engage the lower end thereof, said stop causing the lever to swing about its axis and increase the rotary speed of said member, and means limiting the throw of the lever.

27. In a broiler, the combination of a grid mounted for rotary movement about a vertical axis, means for rotating the grid, a member mounted for movement co-axially with the grid, a spit extending radially from said member, an arm extending radially from said member, a lever fulcrumed intermediate its ends to the grid and having its upper end adapted to engage said arm to form a driving connection between the grid and said member, a flexible stop in the path of the lower end of said lever for causing the lever to swing about its axis to increase the rotary speed of said spit carrying member, and means limiting the angular movement of the lever, the lower end of the lever riding over said flexible stop when the lever is thrown forwardly to its limit of movement.

28. In a broiler, a grid mounted for rotary movement about a vertical axis, an arm secured to said grid, a lever fulcrumed intermediate its ends to said arm to swing in a plane at an angle to the grid, means carried by said arm limiting the throw of said lever, a member mounted to rotate co-axially with the grid and engaged by the upper end of said lever, and a flexible stop in the path of the lower end of the lever, such stop effecting a throw of the lever to the extent of its angular movement.

29. In a broiler, a grid mounted for rotary movement about a vertical axis, a support, a burner spaced from the grid, and means for preventing the grid from sagging comprising an arm projecting from the grid, and a roller carried by the arm in contact with said support.

30. In combination, a support, a circular grid mounted for rotary movement about a vertical axis, an arm secured to the grid, a lever fulcrumed intermediate its ends to said arm to swing in a plane at an angle to the grid, a member adapted to be engaged by the upper end of said lever and to turn co-axially with the grid, a flexible stop in the path of the lower end of said lever, and means for holding the lever in position for registry with its respective engaging members comprising a second arm secured to the grid near said first named arm, and a roller on such arm for riding on the said support.

31. The combination of a support, a rotary shaft extending upwardly through the support, a circular grid secured to shaft above the support, means for supporting the peripheral edge of the grid comprising an arm secured to the grid and a roller on said arm adapted to ride on the support, a removable drip pan on the support comprising a plurality of detachable sections and formed with an opening for said shaft, and an annular trough formed on said pan and forming a track for said roller.

THOMAS A. JENKS.
ROBERT O. HAMMOND